US009444586B2

(12) United States Patent
Vajapeyam et al.

(10) Patent No.: US 9,444,586 B2
(45) Date of Patent: Sep. 13, 2016

(54) TTI-BUNDLING AND SPS OPERATION IN LTE TDD

(71) Applicant: QUALCOMM Incorporated, San Diego, CA (US)

(72) Inventors: Madhavan Srinivasan Vajapeyam, San Deigo, CA (US); Wanshi Chen, San Diego, CA (US); Hao Xu, San Diego, CA (US); Xiaoxia Zhang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 14/507,641

(22) Filed: Oct. 6, 2014

(65) Prior Publication Data

US 2015/0098371 A1   Apr. 9, 2015

Related U.S. Application Data

(60) Provisional application No. 61/887,957, filed on Oct. 7, 2013.

(51) Int. Cl.
*H04L 1/16* (2006.01)
*H04L 1/18* (2006.01)
*H04L 5/00* (2006.01)
*H04L 5/14* (2006.01)

(52) U.S. Cl.
CPC .............. *H04L 1/1678* (2013.01); *H04L 1/189* (2013.01); *H04L 1/1819* (2013.01); *H04L 1/1822* (2013.01); *H04L 1/1861* (2013.01); *H04L 1/1864* (2013.01); *H04L 1/1887* (2013.01); *H04L 5/0082* (2013.01); *H04L 5/14* (2013.01)

(58) Field of Classification Search
CPC . H04L 1/1822; H04L 1/1864; H04L 1/1887; H04L 1/189; H04L 1/1819; H04L 1/1861; H04L 1/1678; H04L 5/14; H04L 5/0082
See application file for complete search history.

(56) References Cited

U.S. PATENT DOCUMENTS

2006/0092973 A1* 5/2006 Petrovic ................ H04L 1/1822
370/469
2009/0257408 A1* 10/2009 Zhang .................... H04L 1/1621
370/336

(Continued)

FOREIGN PATENT DOCUMENTS

EP        2166803 A1    3/2010

*Primary Examiner* — Jianye Wu
(74) *Attorney, Agent, or Firm* — Arent Fox LLP

(57) ABSTRACT

A method, an apparatus, and a computer program product for wireless communication are provided. The apparatus receives a semi-persistent scheduling (SPS) message indicating transmission of a first packet during a first period of a first hybrid automatic repeat request (HARQ) process, and a configuration for TTI-bundled transmission. The apparatus transmits a first TTI-bundled packet on the first resources during the first period of the first HARQ process. The apparatus identifies second resources for transmitting a second TTI-bundled packet during a second period of the first HARQ process based on the SPS message. The apparatus determines whether to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

30 Claims, 12 Drawing Sheets

(56) References Cited

U.S. PATENT DOCUMENTS

| | | | |
|---|---|---|---|
| 2009/0257449 A1* | 10/2009 | Chen | H04L 1/0041 370/470 |
| 2013/0250869 A1 | 9/2013 | Eriksson | |
| 2014/0040694 A1* | 2/2014 | Verma | H04L 1/1812 714/748 |
| 2015/0085796 A1* | 3/2015 | Xu | H04L 1/16 370/329 |

\* cited by examiner

TTI-BUNDLING AND SPS OPERATION IN LTE TDD

CROSS-REFERENCE TO RELATED APPLICATION(S)

This application claims the benefit of U.S. Provisional Application Ser. No. 61/887,957, entitled "TTI-Bundling and SPS Operation in LTE TDD" and filed on Oct. 7, 2013, which is expressly incorporated by reference herein in its entirety.

BACKGROUND

1. Field

The present disclosure relates generally to communication systems, and more particularly, to a semi-persistent scheduling and a transmission time interval bundling.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus receives a semi-persistent scheduling (SPS) message indicating transmission of a first packet during a first period of a first hybrid automatic repeat request (HARQ) process, and an uplink/downlink configuration for transmission time interval-bundled (TTI-bundled) transmission. The apparatus transmits the first TTI-bundled packet on the first resources during the first period of the first HARQ process. The apparatus identifies second resources for transmitting a second TTI-bundled packet during a second period of the first HARQ process based on the SPS message. The apparatus determines whether to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

DETAILED DESCRIPTION

Figure 1:
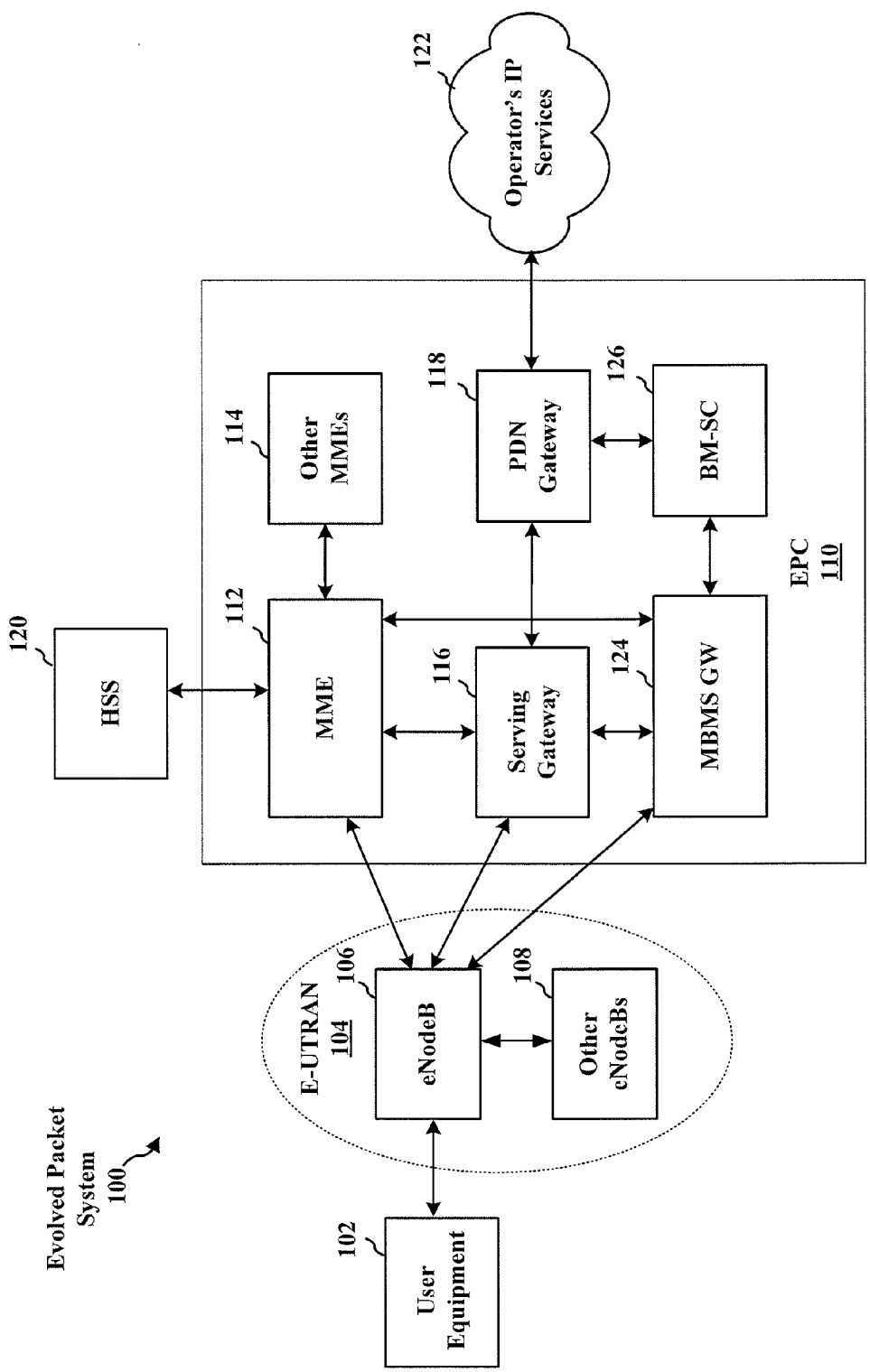
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108.

The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
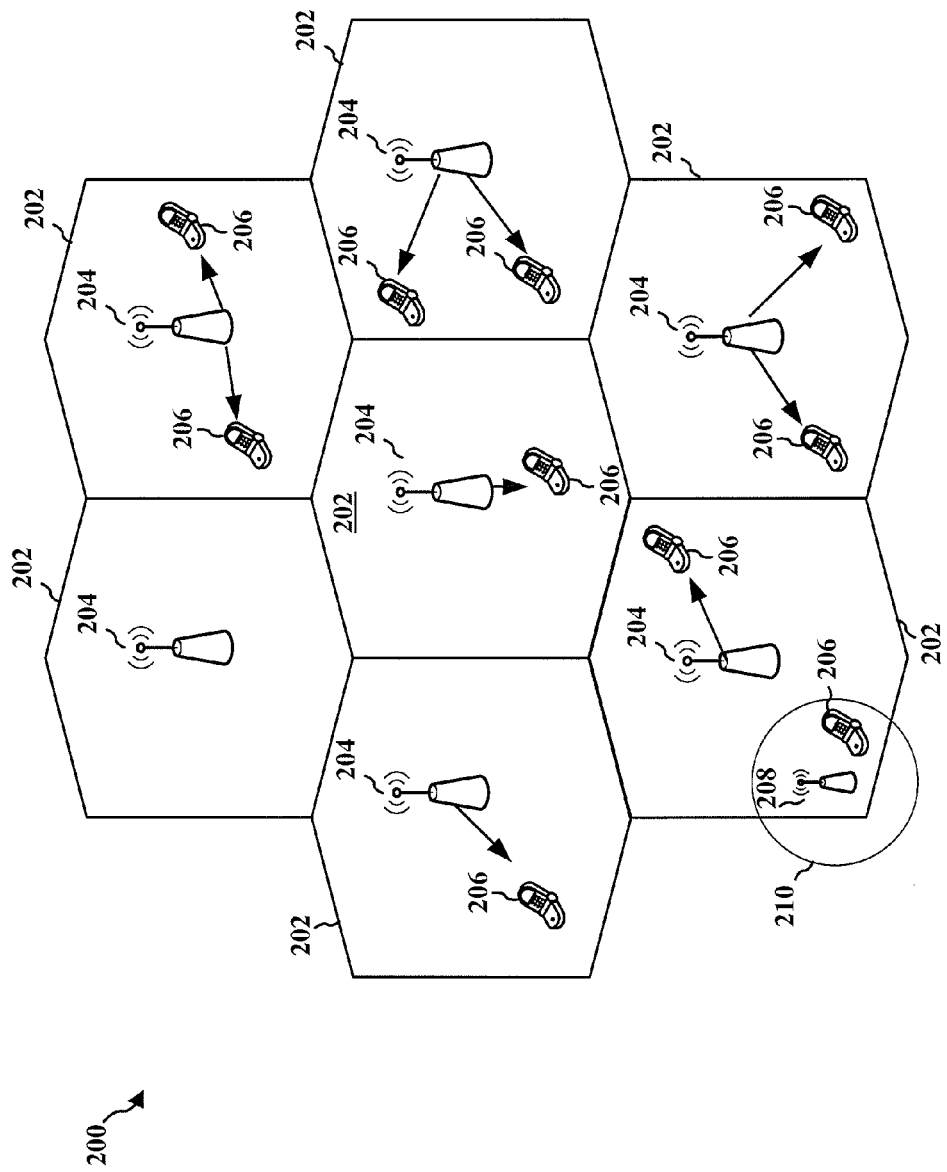
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
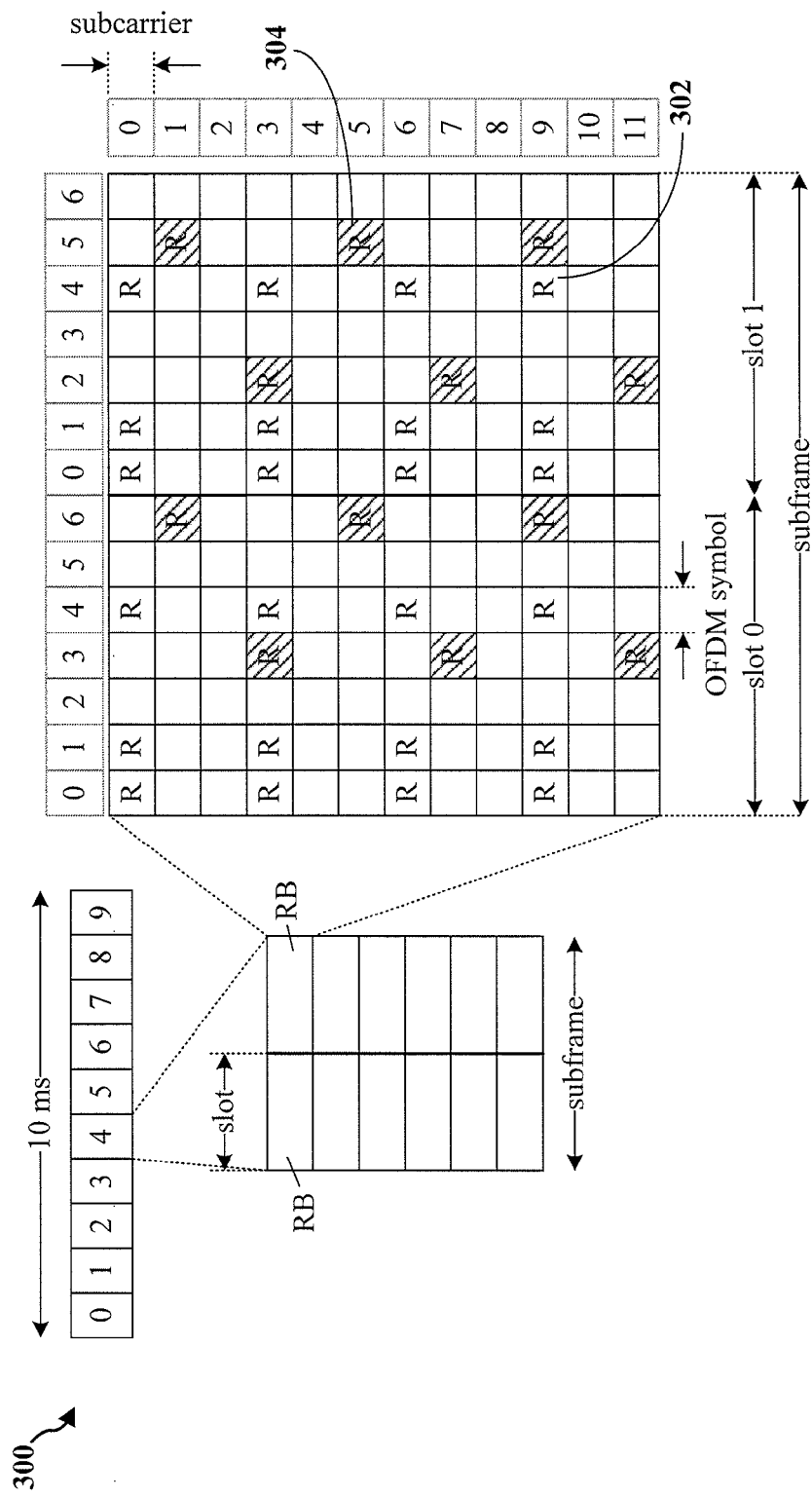
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
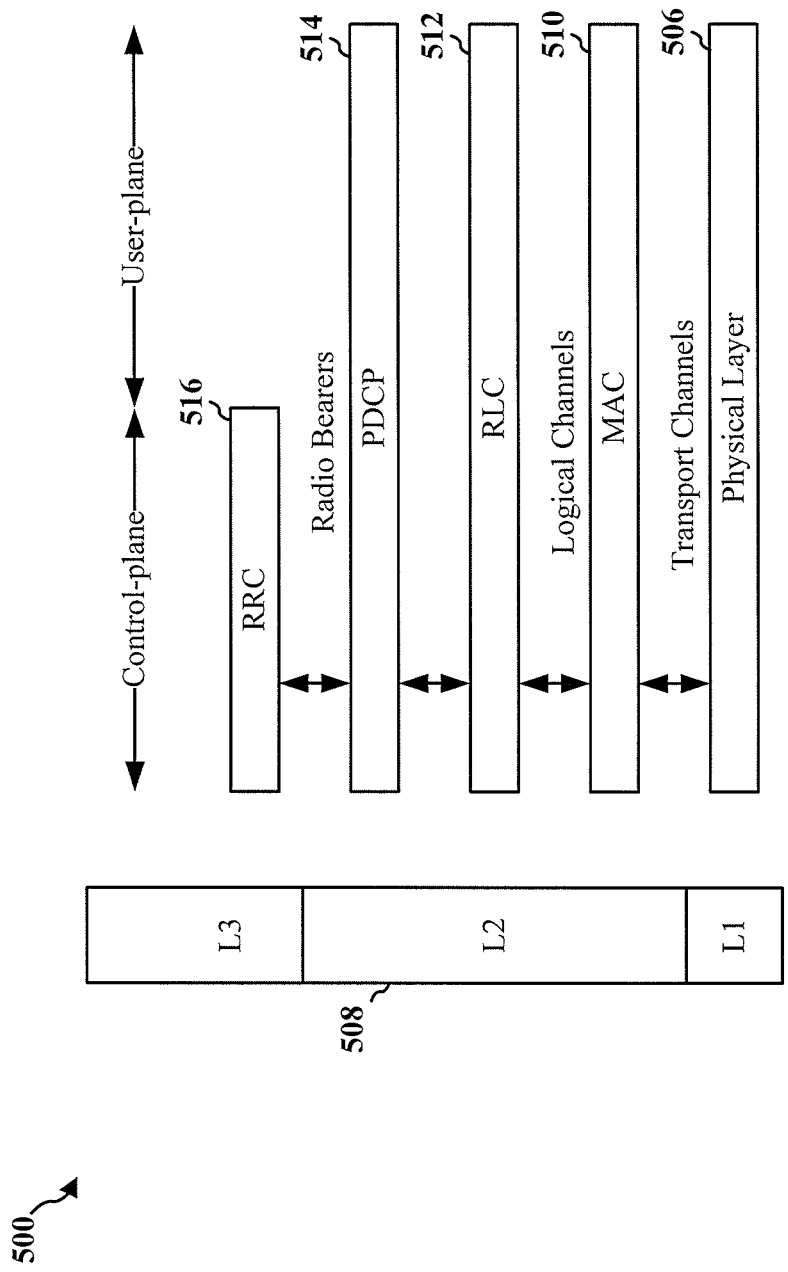
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
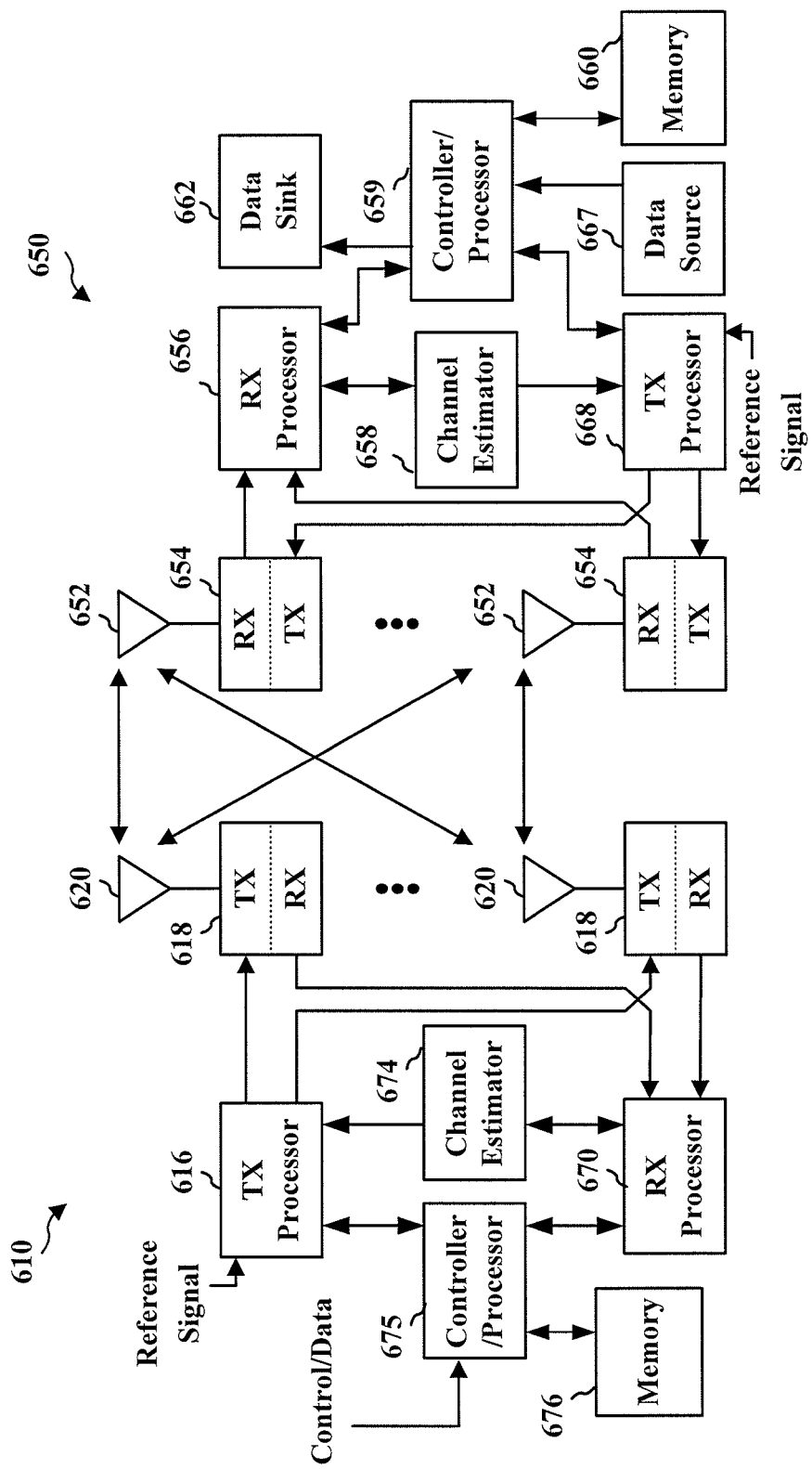
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Semi-persistent scheduling (SPS) and transmission time interval bundling (TTI-Bundling) are two mechanisms used for handling voice over IP (VoIP) traffic. SPS is applied to both uplink and downlink, and minimizes control overhead. TTI-bundling applies to uplink and is directed to improving a link budget for traffic with delay constraints. Conventionally, joint TTI-Bundling (TTI-B) and uplink SPS operation is supported in FDD. However, joint TTI-Bundling (TTI-B) and uplink SPS operation in TDD has not been exploited. Therefore, because the joint operation of SPS and TTI-Bundling (TTI-B) in TDD has not yet been developed, a conventional system can significantly degrade VoIP performance in TDD relative to FDD.

One issue is that a HARQ timeline in TDD poses difficulties with respect to the SPS operation. In a HARQ operation, if an eNB (e.g., the eNB 106) fails to successfully receive a TTI-bundled packet from a UE (e.g., the UE 102), retransmission of the TTI-bundled packet to the eNB may be performed. However, the retransmission of the TTI-bundled packet may collide with transmission of a next TTI-bundled packet associated with a next SPS grant. That is, resources used for the retransmission of the TTI-bundled packet may overlap/collide at least in part with resources used for the transmission of the next TTI-bundled packet. When the collision is expected, the conventional approach dynamically makes adjustments to avoid the collision. For example, either the next SPS grant is dropped to avoid transmission of the next TTI-bundled packet or the retransmission of the TTI-bundled packet is dropped.

Figure 7:
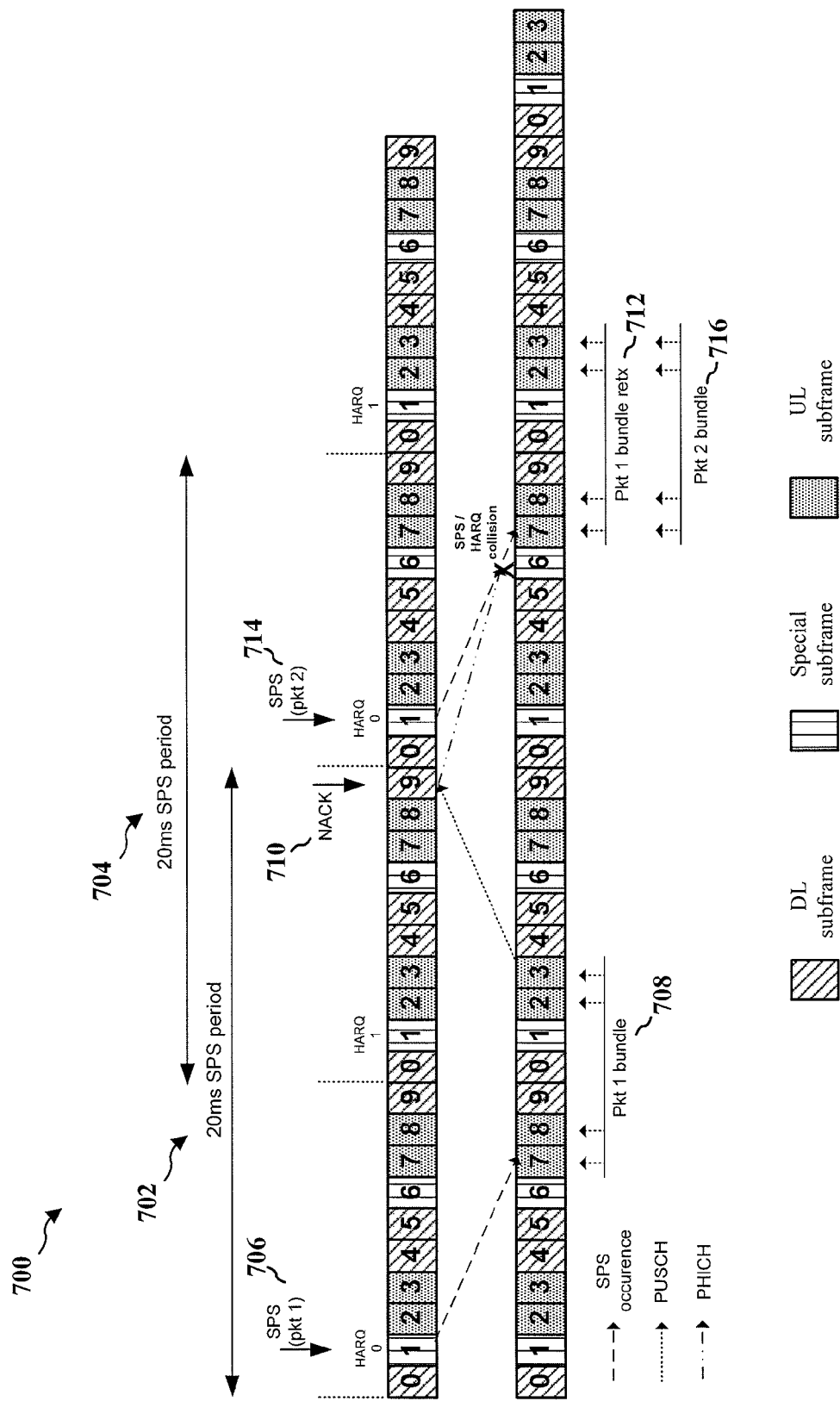
FIG. 7 is a diagram illustrating an example of a joint SPS and TTI-B operation according to a conventional approach.

FIG. 7 is a diagram 700 illustrating an example of a joint SPS and TTI-B operation according to a conventional approach. The example of FIG. 7 utilizes uplink-downlink configuration #1, where the example supports TTI-B and two UL HARQ processes (e.g., HARQ 0 and HARQ 1). The SPS period is 20 ms, and an SPS grant occurs every 20 ms in a typical VoIP configuration. Thus, the SPS period for each HARQ process is 20 ms. FIG. 7 illustrates that the SPS period for a HARQ 0 process 702 is 20 ms. The SPS period for a HARQ 1 process 704 is also 20 ms. According to FIG. 7, the UE receives a first SPS grant 706 for a first packet at subframe 1 during the HARQ 0 process, thereby activating SPS grants. The first SPS grant 706 includes information to enable the UE to transmit a TTI-bundled packet of the first packet (a first TTI-bundled packet) 708 at subframes 7, 8, 2, and 3. For example, the first SPS grant 706 may include information about resources such as subframes 7, 8, 2, and 3 that may be used to transmit the first TTI-bundled packet. The UE subsequently receives a response from the eNB indicating whether the first packet is successfully received at the eNB. The response may be an ACK that indicates that the first packet is successfully received or a NACK that indicates that the first packet is not successfully received. In the example illustrated in FIG. 7, the response from the eNB is a NACK response 710 received at subframe 9. The NACK response 710 triggers the UE to perform retransmission of the first TTI-bundled packet 712 at subframes 7, 8, 2, and 3.

However, the UE also has a second SPS grant 714 for a second packet during a next HARQ 0 process, based on the first SPS grant 706 received at the UE. The second SPS grant 714 may include information about resources such as subframes 7, 8, 2, and 3 that may be used to transmit a TTI-bundled packet of the second packet (a second TTI-bundled packet) 716. The second SPS grant 714 enables the UE to transmit the second TTI-bundled packet 716 at subframes 7, 8, 2, and 3. As a result, the resources used for the retransmission of the first TTI-bundled packet 712 overlap with the resources used for the transmission of the second TTI-bundled packet 716 associated with the second SPS grant 714, thereby causing collision of the retransmission of the first TTI-bundled packet 712 and the transmission of the second TTI-bundled packet 716.

Conventionally, when the collision is expected, either the retransmission of the first TTI-bundled packet 712 is dropped or the second SPS grant 714 is dropped to avoid transmission of the second TTI-bundled packet 716, thereby preventing the collision. The conventional approach may be undesired because dropping the retransmission of the first TTI-bundled packet 712 may result in unsuccessful transmission of the first packet and dropping of the second SPS grant 714 results in no transmission of the second TTI-bundled packet 716. Therefore, an approach to avoid the collision without dropping the retransmission or the SPS grant is desired.

It is noted that, although uplink-downlink configuration #1 is utilized in the example illustrated in FIG. 7, any of the uplink-downlink configurations in Table 1 may be utilized.

TABLE 1

| Uplink-downlink configurations | | | | | | | | | | |
|---|---|---|---|---|---|---|---|---|---|---|
| Uplink-downlink | Subframe number | | | | | | | | | |
| Configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

The issue of TTI-B HARQ/SPS collision in TDD may be addressed by time-offsetting one or more SPS-induced uplink transmissions from the eNB. Because patterns of TTI-bundled packet transmissions caused by SPS grants and potential retransmissions of TTI-bundled packets are known to the UE and the eNB, the UE may offset an SPS-induced uplink transmission to delay the retransmission of a TTI-bundled packet and to avoid collision with a transmission of another TTI-bundled packet. Each SPS grant occurs during a specific HARQ process, which is known to both the UE and the eNB. The time offset may be based on available HARQ processes. For example, if the SPS-induced uplink transmission for a second packet is time-offset, then the SPS-induced uplink transmission for the second packet occurs on a different HARQ process relative to the transmission for the first packet.

Figure 8:
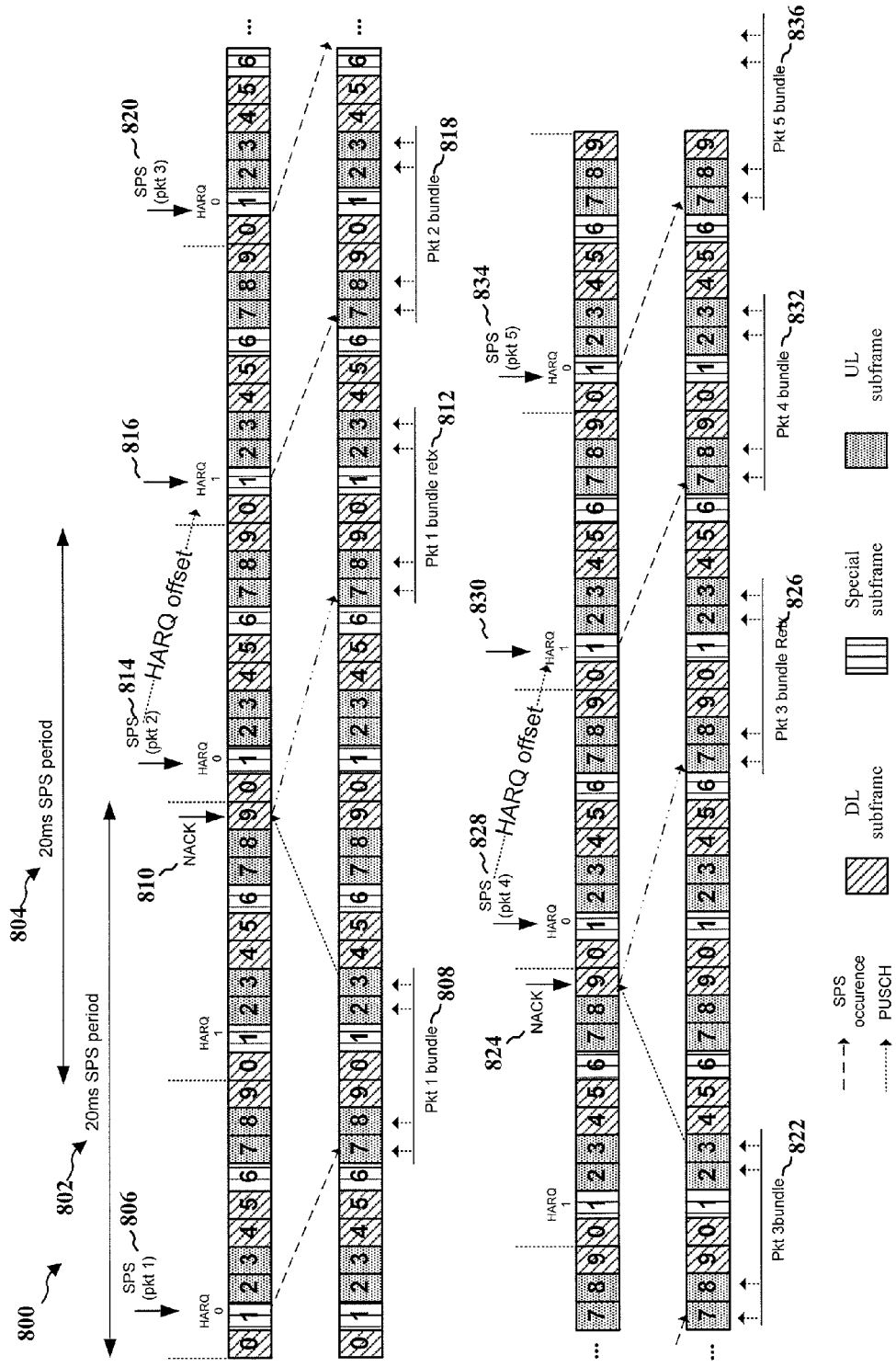
FIG. 8 is a diagram illustrating a first example of a joint SPS and TTI-B operation according to an example embodiment.

FIG. 8 is a diagram 800 illustrating a first example of a joint SPS and TTI-B operation according to an example embodiment. The example of FIG. 8 utilizes uplink-downlink configuration #1, where the example supports TTI-B and two UL HARQ processes (e.g., HARQ 0 and HARQ 1). If HARQ 1 is available, then the second SPS packet can be offset from HARQ 0 to HARQ 1 to avoid a collision. In FIG. 8, the SPS period for the HARQ 0 process 802 is 20 ms. The SPS period for the HARQ 1 process 804 is also 20 ms. In FIG. 8, the UE receives a first SPS grant 806 for a first packet at subframe 1 for HARQ process 0, thereby activating SPS grants. The first SPS grant 806 allows the UE to transmit a TTI-bundled packet of the first packet (a first TTI-bundled packet) 808 at subframes 7, 8, 2, and 3. The UE subsequently receives an ACK or a NACK response from the eNB indicating whether the first packet is successfully received at the eNB. In the example illustrated in FIG. 8, the response is a NACK response 810 that is received at subframe 9. The NACK response 810 triggers the UE to perform retransmission of the first TTI-bundled packet 812 at subframes 7, 8, 2, and 3. Because the UE expects the retransmission of the first TTI-bundled packet 812 based on the NACK response 810, the UE can determine whether the collision will occur by determining whether resources used for the retransmission of the first TTI-bundled packet 812 overlap at least in part with resources used for a transmission of a next TTI-bundled packet associated with a next SPS grant. If the UE determines that the collision will occur, the UE performs a time-offset of the second SPS grant to another HARQ process to avoid the collision. As illustrated in FIG. 8, when the UE determines that the collision will occur, a second SPS grant 814 occurring at a HARQ 0 process is offset to an offset location 816 in a next available HARQ process (e.g., a HARQ 1 process). As a result, the UE treats the SPS location for the second SPS grant 814 to be the offset location 816, and thus performs a delayed transmission of the second TTI-bundled packet 818 after the retransmission of the first TTI-bundled packet 812. In particular, because the UE delays the transmission of the second TTI-bundled packet 818 by offsetting the second SPS grant 814 as illustrated in FIG. 8, the UE can avoid the collision of the retransmission of the first TTI-bundled packet 812 and the second TTI-bundled packet 818. The offset is performed without any dynamic scheduling that may drop an SPS grant or retransmission.

Further, as illustrated in FIG. 8, a third SPS grant 820 for a third packet may occur during a HARQ 0 process for transmission of a TTI-bundled packet of the third packet (the third TTI-bundled packet) 822. If the UE receives a NACK response 824 indicating the first packet is not successfully received at the eNB, the UE performs retransmission of the third TTI-bundled packet 826. To avoid the collision with the retransmission of the third TTI-bundled packet 826, the UE offsets the fourth SPS grant 828 that occurs during a HARQ 0 process to an offset position 830 in a next HARQ process (e.g., a HARQ process 1). Consequently, transmission of a TTI-bundled packet of the fourth packet (the fourth TTI-bundled packet) 824 is delayed due to the offset of the fourth SPS grant 828. A fifth SPS grant 834 for a fifth packet occurs during a HARQ 0 process for transmission of a TTI-bundled packet of the fifth packet (the fifth TTI-bundled packet) 836. The process illustrated in FIG. 8 may be repeated for packets following thereafter. Thus, based on the example in FIG. 8, for the third TTI-bundled packet, the fifth TTI-bundled packet, and the following odd-numbered TTI-bundled packets, the SPS-induced uplink transmission may occur during a HARQ 0 process without any offset. On the other hand, based on the example in FIG. 8, for the fourth TTI-bundled packet, the sixth TTI-bundled packet, and the following even-numbered TTI-bundled packets, the SPS-induced uplink transmission may occur during a HARQ 1 process, which is a HARQ process with an offset.

Figure 9:
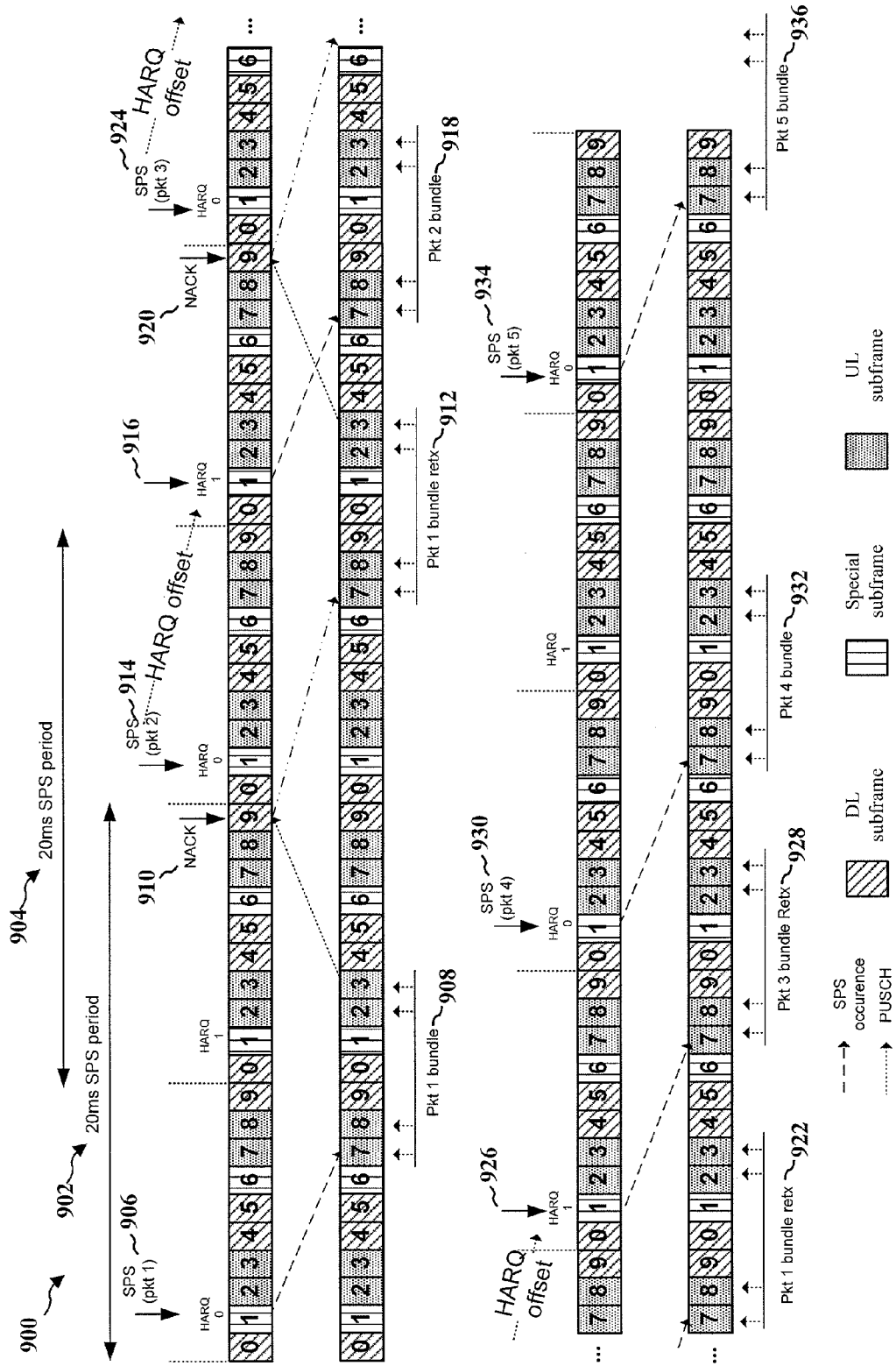
FIG. 9 is a diagram illustrating a second example of a joint SPS and TTI-B operation according to an example embodiment.

FIG. 9 is a diagram 900 illustrating a second example of a joint SPS and TTI-B operation according to an example embodiment. Similar to the example of FIG. 8, the example of FIG. 9 utilizes uplink-downlink configuration #1, where the example supports TTI-B in Rel-8 and two UL HARQ processes (e.g., HARQ 0 and HARQ 1). In FIG. 9, the SPS period for the HARQ 0 process 902 is 20 ms. The SPS period for the HARQ 1 process 904 is also 20 ms. In FIG. 9, the UE receives a first SPS grant 906 that allows the UE to transmit the first TTI-bundled packet 908 at subframes 7, 8, 2, and 3, thereby activating SPS grants. In the example illustrated in FIG. 9, the UE receives a NACK response 910 that indicates that the transmission of the first TTI-bundled packet 908 is not successfully received at the eNB. The NACK response 910 triggers the UE to perform a first retransmission of the first TTI-bundled packet 912 at subframes 7, 8, 2, and 3. Because the UE expects the first retransmission of the first TTI-bundled packet 912 based on the NACK response 910, a second SPS grant 914 occurring at a HARQ 0 process is offset to an offset location 816 in a next available HARQ process (e.g., a HARQ 1 process) to avoid collision with the first retransmission of the first TTI-bundled packet 912. As a result, the UE treats the SPS location for the second SPS grant 914 to be the offset location 916, and thus performs the transmission of the second TTI-bundled packet 918 after the retransmission of the first TTI-bundled packet 912, thereby avoiding collision with the retransmission of the first TTI-bundled packet 912.

However, if the UE receives a NACK response 920 indicating that the first retransmission of the first TTI-bundled packet 912 is not successfully received at the eNB, then the UE performs a second retransmission of the first TTI-bundled packet 922. Because the UE expects the second retransmission of the first TTI-bundled packet 922 based on the NACK response 920, a third SPS grant 924 received at a HARQ 0 process is offset to an offset location 926 in a next available HARQ process (e.g., a HARQ 1 process) to avoid collision with the second retransmission of the first TTI-bundled packet 922. Because the UE treats the offset location 926 to be the SPS location for the third SPS grant 924, the UE performs the transmission of the third TTI-bundled packet 928 after the second retransmission of the first TTI-bundled packet 922. Then, in the example of FIG. 9, the UE has a fourth SPS grant 930 at a HARQ 0 process to enable transmission of a fourth TTI-bundled packet 932, and subsequently has a fifth SPS grant 934 at a HARQ 0 process to enable transmission of a fifth TTI-bundled packet 936.

It is noted that application of a HARQ offset for the SPS-induced uplink transmission may be standardized as follows. In particular, the offset may depend on a TDD UL/DL configuration. Because each UL/DL configuration has different subframe usages for UL and DL, the offset is applied in a different manner depending on the TDD UL/DL configuration. Various UL/DL configurations are shown in Table 1. The offset may also depend on an available number of HARQ processes. For example, if there are three HARQ processes, the UE may select an offset to apply from three different offsets, which are offset=0 (e.g., no offset), offset=1 (e.g., an offset from the first HARQ process to the second HARQ process), and offset=2 (e.g., an offset from the first HARQ process to the third HARQ process). Further, if a process early-terminates, the HARQ offsetting may not be performed. In particular, if the eNB successfully receives a packet from a TTI-bundled packet, then retransmission of the TTI-bundled packet is not necessary, and thus collision will not occur. For example, in the example illustrated in FIG. 8, if the first packet were successfully received in the first transmission of the first TTI-bundled packet 806, then the retransmission of the first TTI-bundled packet would not be necessary, and thus the next TTI-bundled packet could be transmitted without offsetting a SPS grant to avoid a collision.

Several approaches may be implemented to determine the HARQ offset of an SPS grant for the SPS-induced uplink transmission. It is noted that the following approaches may be utilized alone or in combination with one another. In the first approach, a fixed RRC configuration is used to determine the HARQ offset, where the RRC information is received from the eNB. The RRC information may configure a fixed offset for the first "k" SPS instances, and the HARQ offset is applied according to the fixed offset configuration. For example, the RRC configuration may indicate that for the first packet, no offset is applied, for the second packet, an offset is applied, and for the third packet, an offset is applied. The offsets may repeat cyclically according to the RRC configuration. Because the RRC configuration provides a fixed offset setting for each SPS instance, an offset is applied according to the RRC configuration even if the offset is not necessary due to an early termination. If the first approach is applied in the example illustrated in FIG. 8, the RRC configuration may indicate that for k=0, there is no HARQ offset, and for k=1, there is one HARQ offset. Thus, in the example illustrated in FIG. 8, for the even-numbered packets, there is one HARQ offset, and for the odd-numbered packets, there is no HARQ offset. Thus, the offsets are cyclically repeated according to the RRC configuration indicating no offset for k=0 and one offset for k=1. It is noted that, for k=1, the offset is applied regardless of whether the collision is expected or not, because the RRC offset configuration is a fixed configuration. In addition, as an alternative, instead of the HARQ offset, a corresponding subframe offset may be defined.

According to a second approach, the UE includes a list of different types of possible offsets for SPS-induced uplink transmissions. Thus, the UE may apply offsets according to an order of the offset values in the list of possible offsets. Application of the offset values to SPS-induced uplink transmissions may be repeated cyclically according to the list of possible offsets.

According to a third approach, an indication is provided in scheduling information for the UE in order to offset a transmission based on the indication. For example, the indication may be included downlink control information (DCI), which is sent from the eNB to the UE. The indication to apply an offset according to the third approach is provided when the offset is needed to avoid the collision.

According to a fourth approach, when the collision is detected, the UE offsets the SPS-induced uplink transmission to the next available HARQ process. The fourth approach may rely on the UE and the eNB both following a same implicit rule common to both the UE and the eNB. An example of the implicit rule may be: if there is a collision on HARQ process 0, offset an SPS grant to offset an SPS-induced uplink transmission to HARQ process 1, and if HARQ process 1 is not available, offset the SPS grant to offset the SPS-induced uplink transmission to HARQ process 2. The implicit rule is not a fixed rule and may be applied as the collision is detected and offsetting is needed to avoid the collision.

Figure 10:
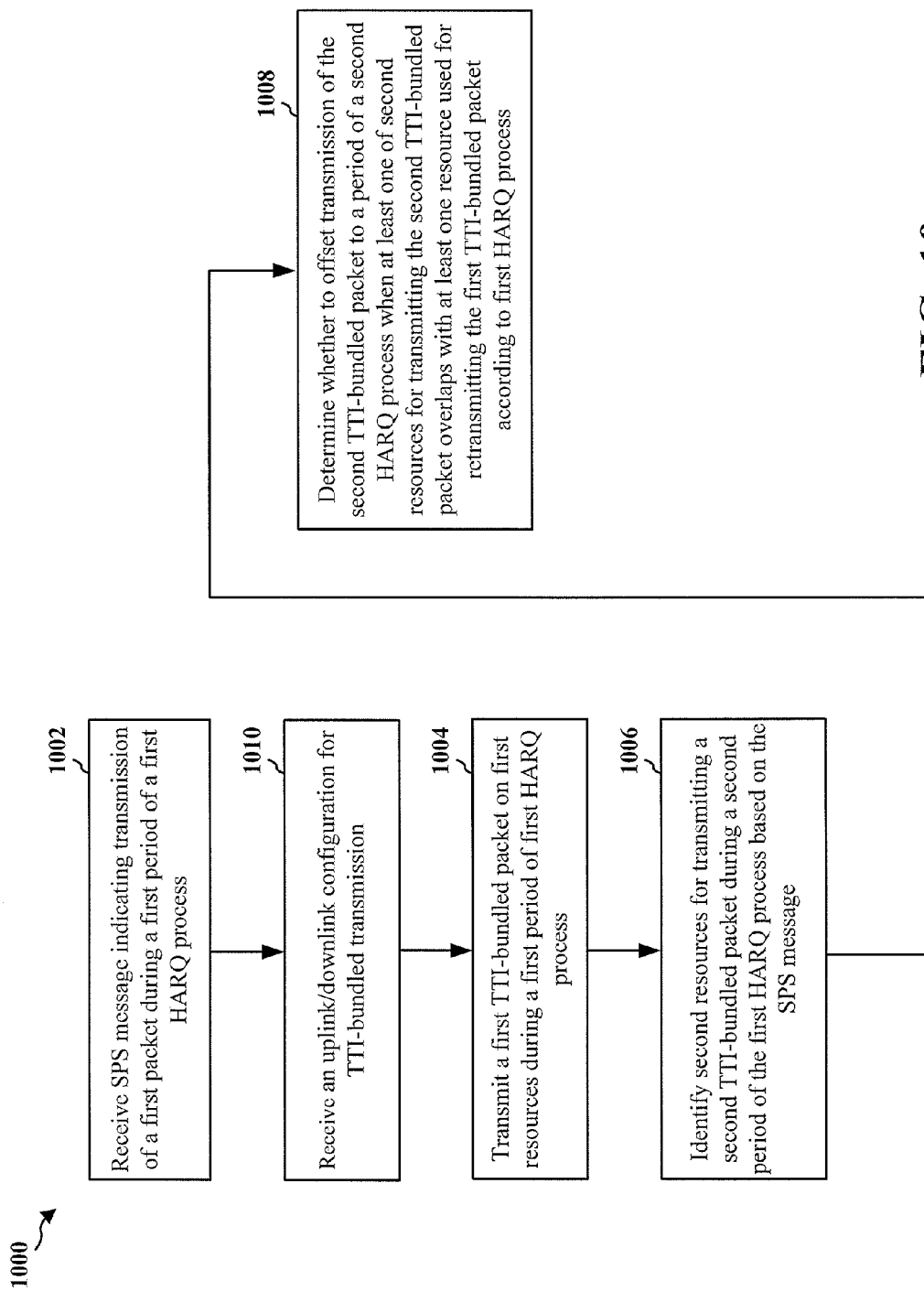
FIG. 10 is a flow chart of a method of wireless communication.

FIG. 10 is a flow chart 1000 of a method of wireless communication. The method may be performed by a UE. At step 1002, the UE receives a SPS message indicating transmission of a first packet during a first period of a first HARQ process. At step 1010, the UE receives an uplink/downlink configuration for transmission time interval-bundled (TTI-bundled) transmission. At step 1004, the UE transmits a first TTI-bundled packet on the first resources during the first period of the first HARQ process. For example, as discussed supra, according to FIG. 8, the UE receives a first SPS grant 806 for a first packet at subframe 1 for HARQ process 0, and the first SPS grant 806 allows the UE to transmit a first packet bundle 808 at subframes 7, 8, 2, and 3. At step 1006, the UE identifies second resources for transmitting a second TTI-bundled packet during a second period of the first HARQ process based on the SPS message. Finally, at step 1008, the UE determines whether to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process. For example, as discussed supra, according to FIG. 8, at the UE, a second SPS grant 814 occurs based on the received first SPS grant 806 to identify second resources for transmitting a second TTI-bundled packet during a second period of the first HARQ process. The UE can determine whether the collision will occur by determining whether resources used for the retransmission of the first TTI-bundled packet 812 overlaps at least in part with resources used for a transmission of a next TTI-bundled packet associated with a next SPS grant. If the UE determines that the collision will occur, the UE performs a time-offset of the second SPS grant to another HARQ process, which delays transmission of the second TTI-bundled packet to avoid the collision.

The determination at step 1008 may be based on at least one of an uplink/downlink configuration or a number of available HARQ processes among the plurality of HARQ processes. Further, the transmission of the second TTI-bundled packet may not be offset to the period of the second HARQ process when the transmitted first TTI-bundled packet is successfully received during the first period of the first HARQ process.

According to a first approach, one or more values of the offset may be determined based on a RRC configuration for predetermined SPS instances received from a base station. The one or more offset values may be repeated cyclically based on the RRC configuration for the predetermined SPS instances. According to a second approach, one or more values of the offset may be determined based on a list of predefined offsets. The one or more offset values may be repeated cyclically based on the list of predefined offsets. According to a third approach, one or more values of the offset may be determined based on an indication provided in scheduling information received from a base station. According to a fourth approach, determining whether to offset the transmission of the second TTI-bundled packet to the period of the second HARQ process may include determining a next available HARQ process for transmitting the second TTI-bundled packet and a corresponding offset value for the next available HARQ process if the at least one of the second resources for transmitting the second TTI-bundled packet overlaps with the at least one resource used for retransmitting the first TTI-bundled packet and the retransmission of the first packet is expected. The determining whether to offset the transmission of the second TTI-bundled packet to the period of the second HARQ process may further include dropping the retransmission of the first TTI-bundled packet if the at least one of the second resources for transmitting the second TTI-bundled packet overlaps with the at least one resource used for retransmitting the first TTI-bundled packet and there is no other available HARQ process for transmitting the second TTI-bundled packet.

Figure 11:
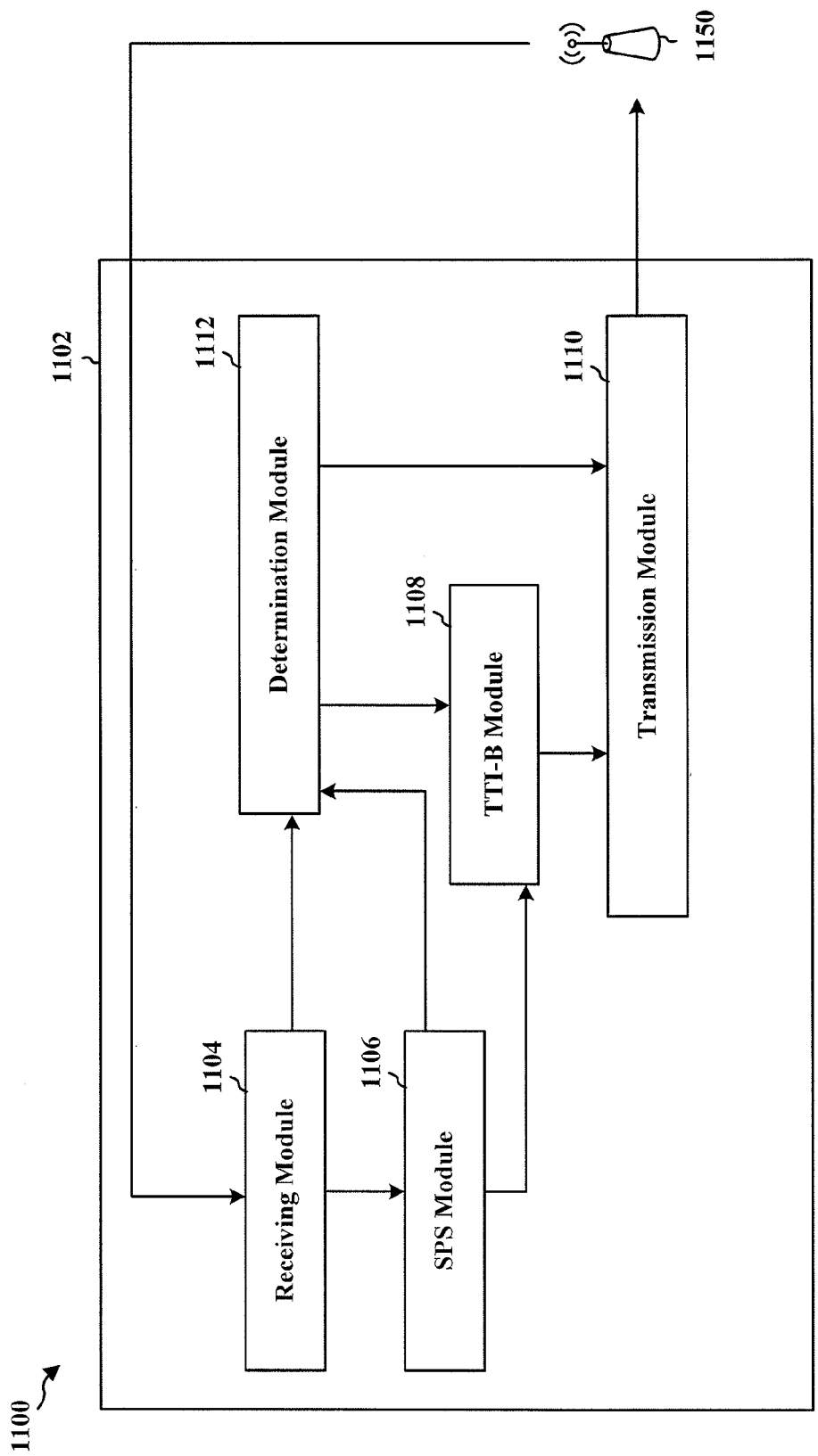
FIG. 11 is a conceptual data flow diagram illustrating the data flow between different modules/means/components in an exemplary apparatus.

FIG. 11 is a conceptual data flow diagram 1200 illustrating the data flow between different modules/means/components in an exemplary apparatus 1102. The apparatus may be a UE. The apparatus includes a receiving module 1104 and an SPS module 1106, where the SPS module 1106 receives via the receiving module 1104 an SPS message from an eNB 1150 indicating transmission of a first packet during a first period of a first HARQ process. The SPS module 1106 also received via the receiving module an uplink/downlink configuration for TTI-bundled transmission. The apparatus includes a TTI-B module 1108 and a transmitting module 1110, where the TTI-B module 1108 transmits via the transmitting module 1110 a first TTI-bundled packet to the eNB 1150 on the first resources during the first period of the first HARQ process. The SPS module 1106 also identifies second resources for transmitting a second TTI-bundled packet during a second period of the first HARQ process based on the SPS message. The apparatus includes a determination module 1112 that determines whether to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
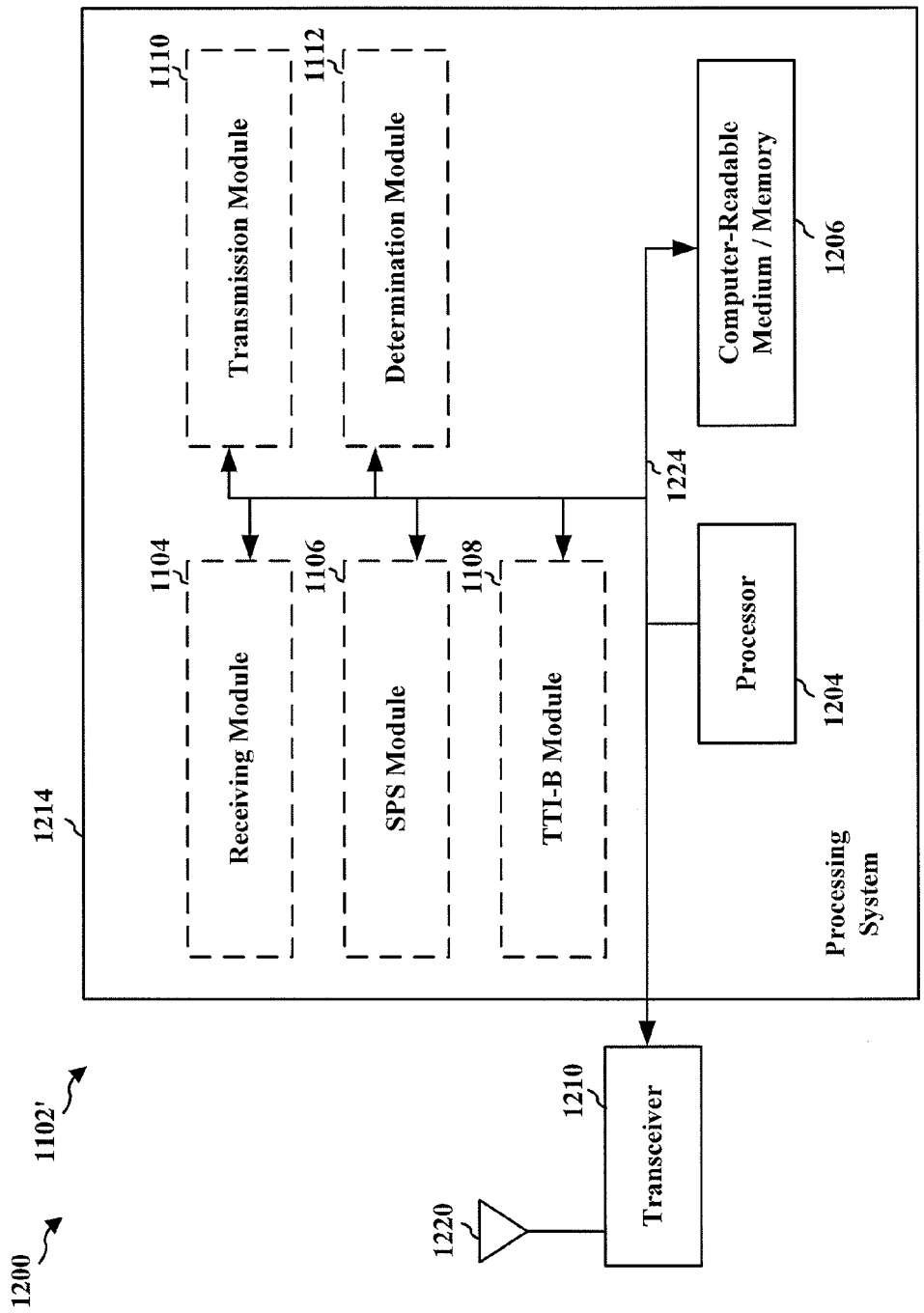
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, and 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for receiving a first semi-persistent scheduling (SPS) message indicating transmission of a first packet during a first period of a first hybrid automatic repeat request (HARQ) process, means for receiving an uplink/downlink configuration for transmission time interval-bundled (TTI-bundled) transmission, means for transmitting the first TTI-bundled packet on the first resources during the first period of the first HARQ process, means for identifying second resources for transmitting a second TTI-bundled packet during a second period of the first HARQ process based on the SPS message, and means for determining whether to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    receiving a semi-persistent scheduling (SPS) message indicating transmission of a first packet during a first period of a first hybrid automatic repeat request (HARQ) process;
    receiving an uplink/downlink configuration for transmission time interval-bundled (TTI-bundled) transmission;
    transmitting a first TTI-bundled packet on first resources during the first period of the first HARQ process;
    identifying second resources for transmitting a second TTI-bundled packet during a second period of the first HARQ process based on the SPS message; and
    determining to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

2. The method of claim 1, wherein the determining is based on at least one of the uplink/downlink configuration or a number of available HARQ processes among the plurality of HARQ processes.

3. The method of claim 1, wherein the transmission of the second TTI-bundled packet is not offset to the period of the second HARQ process when the transmitted first TTI-bundled packet is successfully received during the first period of the first HARQ process.

4. The method of claim 1, wherein one or more values of the offset are determined based on a radio resource control (RRC) configuration for predetermined SPS instances received from a base station.

5. The method of claim 4, wherein the one or more values of the offset are repeated cyclically based on the RRC configuration for the predetermined SPS instances.

6. The method of claim 1, wherein one or more values of the offset are determined based on a list of predefined offsets.

7. The method of claim 6, wherein the one or more values of the offset are repeated cyclically based on the list of predefined offsets.

8. The method of claim 1, wherein one or more values of the offset are determined based on an indication provided in scheduling information received from a base station.

9. The method of claim 1, wherein the determining whether to offset the transmission of the second TTI-bundled packet to the period of the second HARQ process comprises:
    determining a next available HARQ process for transmitting the second TTI-bundled packet and a corresponding offset value for the next available HARQ process if the at least one of the second resources for transmitting the second TTI-bundled packet overlaps with the at least one resource used for retransmitting the first TTI-bundled packet and the retransmission of the first packet is expected.

10. The method of claim 9, wherein the determining whether to offset the transmission of the second TTI-bundled packet to the period of the second HARQ process further comprises:
    dropping the retransmission of the first TTI-bundled packet if the at least one of the second resources for transmitting the second TTI-bundled packet overlaps with the at least one resource used for retransmitting the first TTI-bundled packet and there is no other available HARQ process for transmitting the second TTI-bundled packet.

11. An apparatus for wireless communication, comprising:
    means for receiving a semi-persistent scheduling (SPS) message indicating transmission of a first packet during a first period of a first hybrid automatic repeat request (HARQ) process;
    means for receiving an uplink/downlink configuration for transmission time interval-bundled (TTI-bundled) transmission;
    means for transmitting a first TTI-bundled packet on first resources during the first period of the first HARQ process;
    means for identifying second resources for transmitting a second TTI-bundled packet during a second period of the first HARQ process based on the SPS message; and
    means for determining to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

12. The apparatus of claim 11, wherein the means for determining determines based on at least one of the uplink/downlink configuration or a number of available HARQ processes among the plurality of HARQ processes.

13. The apparatus of claim 11, wherein the transmission of the second TTI-bundled packet is not offset to the period of the second HARQ process when the transmitted first TTI-bundled packet is successfully received during the first period of the first HARQ process.

14. The apparatus of claim 11, wherein one or more values of the offset are determined based on a radio resource control (RRC) configuration for predetermined SPS instances received from a base station.

15. The apparatus of claim 14, wherein the one or more values of the offset are repeated cyclically based on the RRC configuration for the predetermined SPS instances.

16. The apparatus of claim 11, wherein one or more values of the offset are determined based on a list of predefined offsets.

17. The apparatus of claim 16, wherein the one or more values of the offset are repeated cyclically based on the list of predefined offsets.

18. The apparatus of claim 11, wherein one or more values of the offset are determined based on an indication provided in scheduling information received from a base station.

19. The apparatus of claim 11, wherein the means for determining whether to offset the transmission of the second TTI-bundled packet to the period of the second HARQ process is configured to:
determine a next available HARQ process for transmitting the second TTI-bundled packet and a corresponding offset value for the next available HARQ process if the at least one of the second resources for transmitting the second TTI-bundled packet overlaps with the at least one resource used for retransmitting the first TTI-bundled packet and the retransmission of the first packet is expected.

20. The apparatus of claim 19, wherein the means for determining whether to offset the transmission of the second TTI-bundled packet to the period of the second HARQ process is further configured to:
drop the retransmission of the first TTI-bundled packet if the at least one of the second resources for transmitting the second TTI-bundled packet overlaps with the at least one resource used for retransmitting the first TTI-bundled packet and there is no other available HARQ process for transmitting the second TTI-bundled packet.

21. An apparatus for wireless communication, comprising:
a memory; and
at least one processor coupled to the memory and configured to:
receive a semi-persistent scheduling (SPS) message indicating transmission of a first packet during a first period of a first hybrid automatic repeat request (HARQ) process;
receive an uplink/downlink configuration for transmission time interval-bundled (TTI-bundled) transmission;
transmit a first TTI-bundled packet on first resources during the first period of the first HARQ process;
identify second resources for transmitting a second TTI-bundled packet during a second period of the first HARQ process based on the SPS message; and
determine to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

22. The apparatus of claim 21, wherein the at least one processor configured to determine determines based on at least one of the uplink/downlink configuration or a number of available HARQ processes among the plurality of HARQ processes.

23. The apparatus of claim 21, wherein the transmission of the second TTI-bundled packet is not offset to the period of the second HARQ process when the transmitted first TTI-bundled packet is successfully received during the first period of the first HARQ process.

24. The apparatus of claim 21, wherein one or more values of the offset are determined based on a radio resource control (RRC) configuration for predetermined SPS instances received from a base station.

25. The apparatus of claim 24, wherein the one or more values of the offset are repeated cyclically based on the RRC configuration for the predetermined SPS instances.

26. The apparatus of claim 21, wherein one or more values of the offset are determined based on a list of predefined offsets.

27. The apparatus of claim 21, wherein one or more values of the offset are determined based on an indication provided in scheduling information received from a base station.

28. The apparatus of claim 21, wherein the at least one processor configured to determine whether to offset the transmission of the second TTI-bundled packet to the period of the second HARQ process is configured to:
determine a next available HARQ process for transmitting the second TTI-bundled packet and a corresponding offset value for the next available HARQ process if the at least one of the second resources for transmitting the second TTI-bundled packet overlaps with the at least one resource used for retransmitting the first TTI-bundled packet and the retransmission of the first packet is expected.

29. The apparatus of claim 28, wherein the at least one processor configured to determine whether to offset the transmission of the second TTI-bundled packet to the period of the second HARQ process is further configured to:
drop the retransmission of the first TTI-bundled packet if the at least one of the second resources for transmitting the second TTI-bundled packet overlaps with the at least one resource used for retransmitting the first TTI-bundled packet and there is no other available HARQ process for transmitting the second TTI-bundled packet.

30. A computer program product stored on a non-transitory computer-readable medium and comprising code that when executed on at least one processor causes the at least one processor to:
receive a semi-persistent scheduling (SPS) message indicating transmission of a first packet during a first period of a first hybrid automatic repeat request (HARQ) process;
receive an uplink/downlink configuration for transmission time interval-bundled (TTI-bundled) transmission;
transmit a first TTI-bundled packet on first resources during the first period of the first HARQ process;
identify second resources for transmitting a second TTI-bundled packet during a second period of the first HARQ process based on the SPS message; and
determine to offset transmission of the second TTI-bundled packet to a period of a second HARQ process when at least one of the second resources for transmitting the second TTI-bundled packet overlaps with at least one resource used for retransmitting the first TTI-bundled packet according to the first HARQ process.

* * * * *